Dec. 18, 1951 J. TURNER 2,579,407
BROKEN STRAND INDICATOR
Filed Feb. 1, 1951 2 SHEETS—SHEET 1
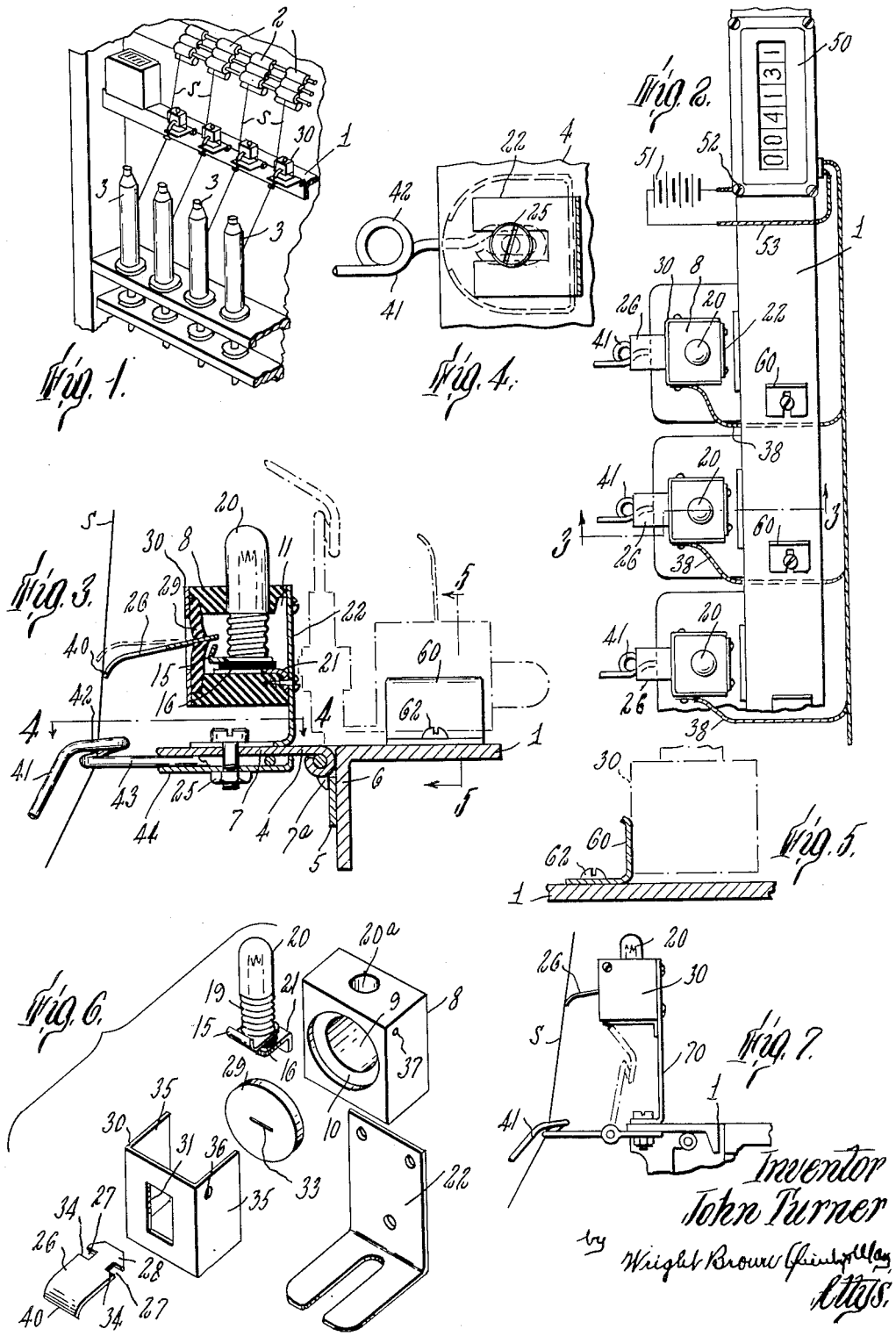
Inventor
John Turner
by Wright Brown Quinby May
Attys.

Dec. 18, 1951   J. TURNER   2,579,407
BROKEN STRAND INDICATOR
Filed Feb. 1, 1951   2 SHEETS—SHEET 2
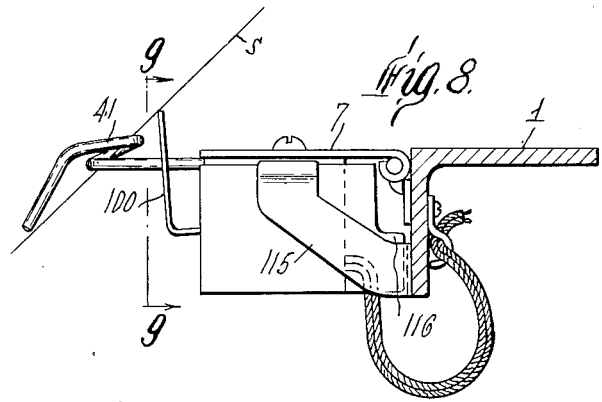
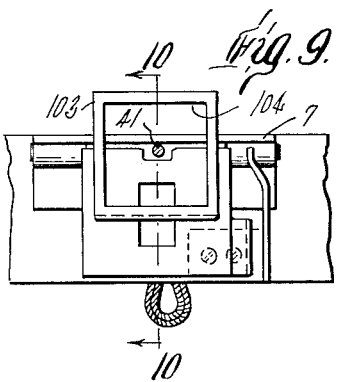
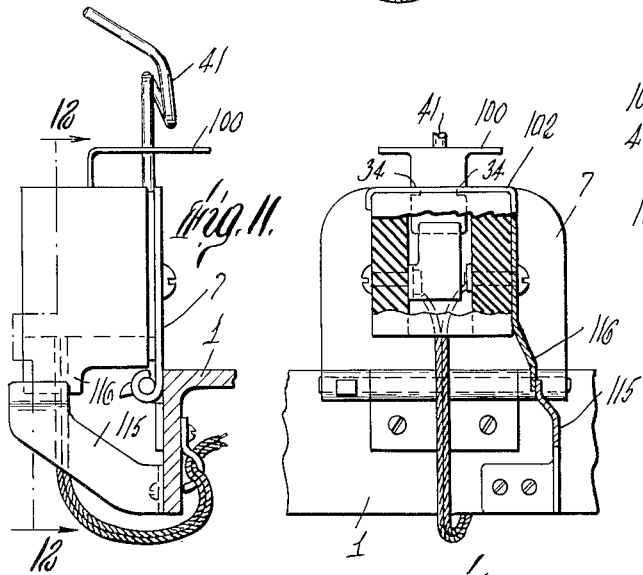
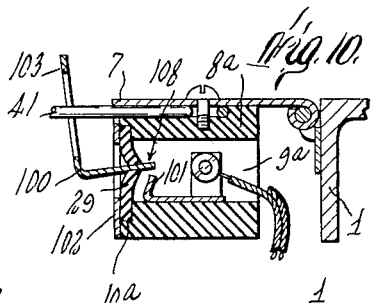
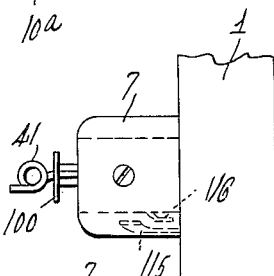
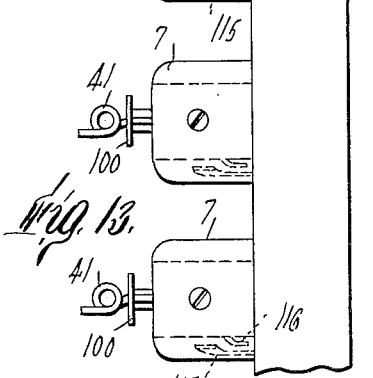
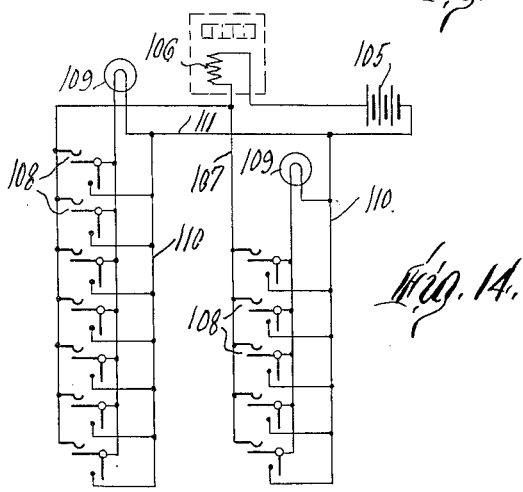
Inventor
John Turner
by Wright, Brown, Quinby & May
Attys.

Patented Dec. 18, 1951

2,579,407

UNITED STATES PATENT OFFICE 2,579,407

BROKEN STRAND INDICATOR

John Turner, Boston, Mass.

Application February 1, 1951, Serial No. 208,856

10 Claims. (Cl. 57—81)

1

In many textile manufacturing operations, it is important that whenever a strand is broken, or the supply of strand material for any reason fails, the operator of the machine may be made aware of it so that repairs of the broken strand, or the replacement of a missing strand, may be made promptly. The operator should also be made aware when excessive strand breakage occurs in order that the cause for such excessive breakage may be located and corrected.

An object of the present invention, therefore, is to provide inexpensive mechanism by which the breakage or absence of a strand will produce a signal for the machine operator and after the break or failure has been corrected, a counter will be actuated. By employing a counter the frequency of strand breakage or failure can be determined for any desired number of strands and during any desired period of time. Should this be found to be excessive it will give notice to the operator so that it may be investigated and corrected.

It is a further object of the invention to provide such a mechanism which shall be readily installed and which will offer no operational hazard to the operator.

A further object is to provide an electrically operated mechanism operated at such low voltage that no fire risk is involved.

A further object is to provide for wiping contact between the various circuit making and breaking elements so that presence of foreign matter is not liable to put the apparatus out of order.

For a more complete understanding of this invention, reference may be had to the accompanying drawings in which Figure 1 is a fragmentary perspective view of a drawing and spinning frame showing mechanism embodying the invention applied thereto.

Figure 2 is a fragmentary top plan view of the mechanism to a larger scale than Figure 1.

Figure 3 is a detail sectional view to a larger scale on line 3—3 of Figure 2.

Figures 4 and 5 are detail sectional views on lines 4—4 and 5—5, respectively, of Figure 3.

Figure 6 is an exploded perspective view of certain of the parts.

Figure 7 is a fragmentary end elevation to a reduced scale and showing a modified construction.

Figure 8 is a view similar to Figure 7, but to a larger scale and showing a further modification.

Figure 9 is a detail sectional view on line 9—9 of Figure 8.

2

Figure 10 is a detail sectional view on line 10—10 of Figure 9.

Figure 11 is a view similar to Figure 8, but showing the parts in different positions.

Figure 12 is a detail sectional view on line 12—12 of Figure 11.

Figure 13 is a view similar to a portion of Figure 2, but showing the modification of Figures 8 to 12.

Figure 14 is a wiring diagram of the mechanism shown in Figure 13.

Referring first to the construction shown in Figures 1 to 6, at 1 in Figures 1 to 5 is shown a thread board of a textile machine, herein shown as a drawing and spinning frame. This board, as shown, may be of conducting material such as an angle iron. Above and back of it may be arranged a plurality of series of drawing rolls 2 from each of which a strand passes to a spindle 3. Between the drawing rolls and the spindles, means are positioned to be responsive to the breaking of the strand or the absence of a strand, there being one of such devices for each of the spindles 3.

In Figure 3 there is best shown one form of indicating device which may be employed. As shown it comprises a hinge member 4 having one leaf 5 secured to the outer vertical flange 6 of the thread board 1. The other leaf of this hinge shown at 7 may be swung between a substantially horizontal position limited by a stop lug 7a and shown in full lines in Figure 3 to the vertical position shown in dotted lines in the same figure. To this leaf 7 is secured a broken thread indicator comprising an insulating casing or block 8, which, for the reason of cheapness, may be formed as a wooden tubular member, this being a sufficiently good insulator for the conditions involved.

As shown in Figure 6, this block 8 may have a central bore 9 therethrough provided with a counterbored end portion 10 at one end and a similar counterbored portion 11 at the opposite end. Within the bore 9 a stationary electrical contact 15 having an upwardly and inwardly turned end is mounted on an insulating base 16 and is in electrical connection with the shell 19 of a small indicator lamp 20 which projects through an opening 20a in the block 8. This may be a lamp such as is used in a flash light which takes a very small current. The central terminal of the lamp is connected to a fixed conductor 21 which extends into the counterbored portion 11 and is electrically secured to an angle-shaped bracket 22, one leg of which is secured to the leaf 7 as by a bolt and nut 25. Thus the terminal 15 is in series with the filament of the lamp 20 and in circuit through the angle member 22 with the hinge 7 and thus with the thread board 6 which is grounded through the machine frame.

A movable terminal 26 is formed as a flat strip, the inner portion of which is thrust through a perforation 33 in a disk of resilient material such as rubber at 29, this being engaged within the counterbored portion 10 of the block 8 and secured in position by a U-shaped metal bracket 30. This bracket 30 is provided with a slot 31 through its central portion which permits free passage of the terminal 26. In order to secure this terminal 26 in the member 29 and to provide for wiping contact between the terminal and the forward face of the bracket, it is shown in Figure 6 as provided with outwardly disposed notches 27 into which the material of the piece 29 may spring after the inner end portion 28 of the terminal has been inserted through the perforation 33 of the piece 29. The portion of the terminal outwardly of the notches 27 is wider than the slot 31 and the piece 29 acts to pull the terminal inwardly with its edges 34 against the bracket 30. The wings 35 of the member 30 may be engaged against opposite side walls of the block 8 and may be secured in position as by screws which pass through holes 36 through these wings and into holes 37 of the block, one of these holes being shown in Figure 6 and serving as a connection for the conductor 38.

The outer end portion of the member 26 is down-turned as at 40, and the strand or thread passing from the drawing rolls to the spindles engages this down-turned portion as shown in Figure 3 and normally holds the member 26 out of contact with the fixed terminal 15. Below the member 26 a strand guide 41 is mounted. This guide, as shown, comprises a loop portion 42 through which the strand passes and a shank portion 43 which is clamped against the lower face of the hinge member 7, as by the bolt and nut at 25, and a clamping plate 44 engaged thereby.

Whenever the strand or thread normally passing down across the forward edge of the contact member 26 is broken or fails to be present, the resilient action of the piece 29 lifts the outer end of the contact element 26 and lowers its inner end, the lowering of the inner end making electrical connection with the fixed terminal 15, these members 26 and 15 constituting a switch which is open during normal operation of the machine but closes automatically when the strand breaks or when no strand is present. These switches for the several spindles are connected up in a low voltage electric circuit (say, of about 6 volts) with a counter 50 shown in Figure 2, this counter 50 having any suitable type of electrically actuated means which acts at each energization under sufficient power to step the counter along one number. Such counters are per se old and well known and no further description appears to be necessary. Such a mechanism is arranged in series with a suitable source of electric current such as the battery 51 shown in Figure 2, one terminal of the battery being grounded as on the thread board at 52, the other terminal of the battery leading through the wire 53 to the counter actuating mechanism and then in parallel to a plurality of leads 38, each of which is connected to the bracket 30 of one of the indicators, the other side of each indicator being connected through the bracket 22 and the hinge member 4 and to the thread bar 1.

Whenever any of the threads leading to the spindles breaks or is absent for any reason, the corresponding switch comprising the movable and fixed contacts 26 and 15 is closed through the corresponding signal lamp 20 and through the actuating mechanism of the counter. However, the lamp 20 permits such a small flow of current that the counter is not actuated. The operator, seeing any one or more of the lamps 20 lighted, then proceeds to repair the break and in order to move the indicator and the thread guide 41 out of the way, tilts the indicator backward into the dotted line position of Figure 5. In this position of the parts, a side portion 35 of the bracket 30 is brought into engagement with an angle member 60 secured to the upper face of the thread bar 1 as by the screw 62. This provides a short circuit for the lamp 20 and the switch comprising the contacts 26 and 15, which cuts out the current limiting effect of the lamp 20 and allows a flow of current through the counter sufficient to actuate it so that it counts ahead by one. When the repair has been completed, the operator returns the indicator to the operative position shown in Figure 3 and threads the strand through the eye 41, whereupon the action of the machine in so far as this strand is concerned continues in the normal manner. However, it will be noted that due to the operator turning back the indicator and the switch, the counter has been stepped forward by one count, thus showing that there has been one strand breakage. Whenever as the operator finds a broken strand and turns the corresponding thread guide and indicator backwardly, the counter is caused to move forward by a single count.

In Figure 7 a slight modification is shown in which the indicator lamp 20 and the switch mechanism for each strand are held in a stationary position, being shown as mounted on an angle bracket 70. However, the thread guide 41 is hinged so that it may be turned between the full and dotted line position shown in Figure 7. The full line position is the normal operating position and when a strand is passed through the eye of the thread guide, which engages the contact arm 26 as shown and holds the switch open, the indicator lamp is extinguished. However, after a thread breakage, when the operator swings the thread guide upwardly and backwardly into the dotted line position of Figure 7, it contacts with a conducting portion of the indicator mechanism, short circuiting the switch and the lamp and allowing sufficient current flow to operate the counter. As shown in this figure, the support 70 has a forwardly projecting portion with which the thread guide makes electrical contact.

In Figures 8 to 14, a further modification has been shown particularly suitable for use in connection with strands of smooth surface such as rayon and nylon, and the like. In this arrangement a plurality of strand-controlled switch elements are associated with a single indicator and a plurality of indicators each with its series of switches are shown as associated with a single counter. Thus each individual switch mechanism does not have associated therewith its own indicator, a single indicator being associated with a plurality of switches. As shown the hinge leaf 7 carries the thread guide 41 and it also has secured thereto the switch casing 8a which may be somewhat similar to the casing 8 shown in Figure 3. This casing 8a has a central bore 9a counterbored at one end as at 10a for the reception of the rubber disk 29 which carries a contact element 100. This contact element 100 is mounted similarly to the contact element 26, previously described, and is normally closed against a fixed contact 101 mounted within the bore 9a. A slotted plate 102 retains the disk 29 in position and shoulders such as the shoulders 34 of the element 26 are pulled back by the disk 29 into contact with the forward face of this plate 102. The outer end of the contact 100, however, is differently formed from the corresponding portion of the member 26, being turned sharply upward and provided with a rectangular rim portion 103 surrounding an open area 104 through which the thread guide 41 may be extended. In normal operating position the switch is open, being so held by the strand S bearing on its upper edge as shown in Figure 8, but on breaking of this strand, or should no strand be present, contact is immediately made between the elements 100 and 101, this closing a circuit from a source of low voltage power 105 shown in Figure 14 through the counter actuating member 106, lead 107, the switch closed by the breaking of the strand being any one of the switches 108 shown in this figure, one of the indicator lamps 109, and back through the leads 110 and 111 to the electrical supply source 105. Any one of the switches 108 thus being closed, causes one of the indicator lamps 109 to light, the arrangement as shown being such that a series of switches 108 are arranged in parallel with each other and all being in series with one indicator lamp and in series with the counter actuating means at 106. Lighting of one of the lamps therefore indicates to the operator that at least one of a definite bank of switches has been closed and it is an easy matter for the operator to pick out which of these switches has been closed. When the corresponding switch mechanism and the thread guide is thrown backwardly about its hinge connection into the position shown in Figure 11, a contact arm 115 secured to the thread bar 1 makes a wiping contact with an arm 116 secured to the corresponding switch element, this arm 116 being shown as integral with the slotted plate 102 against the outer face of which the shoulders 34 of the contact element 100 are caused to bear by the action of the resilient disk 29. This acts to short circuit the switch and the corresponding indicator 109, so that a substantial increase of current flow through the counter is permitted which results in stepping the counter forwardly by one count. When the broken strand has been mended and the parts have been returned to the operating condition of Figure 8, none of the indicator lamps is lighted until a strand breakage or failure occurs at some point in the system, whereupon one of the signal lamps lights and the procedure hereinbefore outlined is followed which results in the counter being moved forward by one count before the mechanism has been returned to full operating condition.

From the foregoing description of certain embodiments of this invention it should be evident to those skilled in the art that various further changes and modifications may be made without departing from its spirit or scope.

I claim:

1. A textile machine having a thread board, a plurality of thread guides arranged along said board, a broken thread indicator for each guide, said guides being hinged to said board and swingable between operative and inoperative positions, a counter, and means responsive to the swinging of any of said guides to inoperative position to actuate said counter by one count.

2. In a textile machine having a thread board, a plurality of thread guides arranged along said board, a broken thread indicator for each guide, each of said guides and indicators being hinged to said board and swingable between operative and inoperative positions, a counter, and means responsive to the swinging of any of said guides and indicators to inoperative positions to actuate said counter by one count.

3. In a textile machine having a thread board, a plurality of thread guides arranged along said board, a broken thread indicator switch for each guide, each of said guides and switches being hinged to said board and swingable between operative and inoperative positions, a counter, and means responsive to the swinging of any of said guides and switches to inoperative position to actuate said counter by one count.

4. In a textile machine having a thread board, a plurality of thread guides arranged along said board, a broken thread indicator switch for each guide, an indicator responsive to the actuation of any of a plurality of said switches, each of said guides and switches being hinged to said board and swingable between operative and inoperative positions, a counter, and means responsive to the swinging of any of said guides and switches to inoperative position to actuate said counter by one count.

5. In a textile machine having a thread board, a plurality of thread guides arranged along said board, each movable between an operative and an inoperative position, an electrically actuated broken thread indicator for each guide, a counter having an electrically actuated actuating means actuating said counter by one count on sufficient current flow therethrough, said counter actuating means being in series with said indicators and said indicators being in parallel with each other, and said indicators when energized maintaining current through said electrically actuated means at too low a value to actuate said counter, and means actuated by the motion of any of said guides to inoperative position to short circuit its respective indicator and thereby increase the current flow through said counter actuating means sufficiently to actuate said counter to make a count.

6. In a textile machine having a thread board, a plurality of thread guides arranged along said board and each movable between an operative and an inoperative position, a switch for each guide, a plurality of indicators, each indicator arranged to be actuated by the closing of any of a plurality of said switches, a source of low voltage electrical power, a counter having an electrically actuated means for actuating said counter by one count on sufficient current flow therethrough, said counter actuating means being in series with said switches and indicators and said indicators being arranged in parallel with each other, any of said indicators when energized maintaining current through said electrically actuated means at too low a value to actuate said counter, and means actuated by the motion of any of said guides to inoperative position to short circuit its respective indicator and thereby increase the current flow through said counter actuating means sufficiently to actuate said counter to make a count.

7. In a textile machine having an electroconductive thread board, a plurality of thread guides arranged along said board and each movable between an operative and an inoperative position, an electrically actuated indicator for each guide, a source of low voltage power, a counter having an electrically actuated actuating means for actuating said counter by one count on sufficient current flow therethrough, said source, counter, said indicators and board being arranged in circuit, said indicators being arranged in parallel with each other in said circuit, each of said indicators being responsive to absence of a thread through the corresponding guide to pass current of too low value to actuate said counter through said circuit including the corresponding indicator, and means actuated by motion of the corresponding thread guide to inoperative position to short circuit the corresponding indicator to said thread board and thereby allow sufficient current flow in said circuit to actuate said counter by one count.

8. In a textile machine having an electroconductive thread board, a plurality of thread guides arranged along said board and each movable between an operative and an inoperative position, a switch for each guide, a plurality of indicators, a source of low voltage power, a counter having an electrically actuated means for actuating said counter by one count on sufficient current flow therethrough, said source, counter, said indicators, switches and board being arranged in circuit, a plurality of said switches being arranged in parallel with each other in said circuit and in series with one of said indicators, each of said indicators being responsive to absence of a thread through any of the corresponding guides to pass current of too low value to actuate said counter through the circuit including the corresponding indicator, and means actuated by motion of the corresponding thread guide to inoperative position to short circuit the corresponding switch and indicator to said thread board and thereby allow sufficient current flow in said circuit to actuate said counter by one count.

9. A switch comprising a tubular casing, a fixed contact within said casing, a piece of deformable resilient material engaged at its margin in said casing and having a perforation therethrough, and a movable contact carried by said piece in said perforation and normally yieldingly held in predetermined relation to said fixed contact and movable by pressure exerted thereon into a different predetermined relation to said fixed contact.

10. An indicator comprising a tubular casing, a fixed contact within said casing, a lamp in said casing in series with said fixed contact, a piece of deformable insulating material engaged at its periphery to said casing and having a perforation therethrough, a movable contact carried by said piece and extending through said perforation and normally yieldingly held by said piece in predetermined relation to said fixed contact and movable by pressure exerted thereon into a different predetermined relation to said fixed contact whereby to effect the opening and closing of a circuit through said lamp by breaking or making connections between said fixed and movable contacts.

JOHN TURNER.

No references cited.